Sept. 16, 1952      M. K. HEDGE      2,610,539
CAMOUFLAGED FISHING LINE AND METHOD OF MAKING THE SAME
Filed Dec. 26, 1946
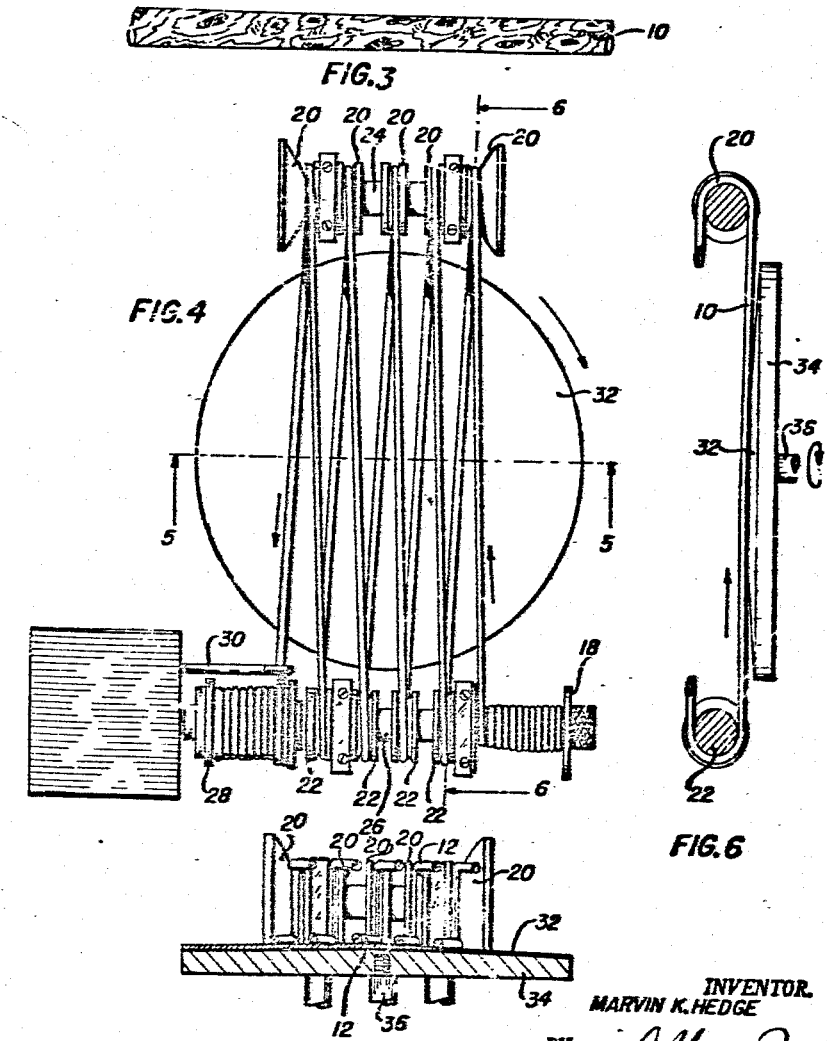
INVENTOR.
MARVIN K. HEDGE Patented Sept. 16, 1952

2,610,539

UNITED STATES PATENT OFFICE 2,610,539

CAMOUFLAGED FISHING LINE AND METHOD OF MAKING THE SAME

Marvin K. Hedge, Portland, Oreg.

Application December 26, 1946, Serial No. 718,503

6 Claims. (Cl. 87—1)

This invention relates to lines having mottled appearances and, more specifically, camouflaged fishing or fly lines and methods of making the same.

Lines heretofore commonly employed in connection with the taking of fish have generally been of a single, uniform color. Generally said lines are formed from suitable thread which is braided into the finished line. Attempts have been made from time to time to vary the overall uniformity of color by braiding differently colored threads into the line, but this nevertheless results in at least a regular or uniform pattern which does not resemble natural objects normally found in waters inhabited by fish. Consequently, when said conventional lines are used, fish are frequently wary of them.

Other attempts have been made to vary the color of lines of this nature by coiling a line and dipping parts of the coil in different colored dyes, thus producing lines having successively differently colored sections, very much resembling other lines which have been differently colored for regular intervals of their length to indicate the length of the cast or the amount of the line which has been payed out.

It is therefore an object of this invention to produce a line having a mottled color scheme of which the colors comprising the scheme are different or are different shades of the same color, the important feature being that the pattern is irregular and, preferably, no two linear sections of the line will have the same identical patterns; whereby such line may be used for decorative or ornamental purposes or as a camouflaged fishing line.

As a corollary to the foregoing object, it is a further object to produce on a line a color scheme resembling natural objects appearing in fish-inhabited waters such as wood which is waterlogged and/or rotten, the reflection of light rays on the stems of water plants, or many other objects and reflections naturally found in fishing waters.

It is another object of this invention to produce such a line by a method and means which automatically impart the desired color effect and scheme thereto, relying in some instances upon the natural contour of the original braided line to control the final disposition of the plurality of colors or shades to be combined in the finished color scheme of the line, and in other instances upon the functioning of the machine on which the desired finish is imparted to the line.

Details of these objects, as well as of the invention, and other objects thereof are set forth in the following specification and illustrated in the attached drawing forming a part thereof.

In the drawing:

Fig. 1 illustrates a short section of a braided line to which layers of colored coatings have been applied but before the finished effect has been produced on the line, half of the line is shown in section to better illustrate the coatings.

Fig. 2 is a view similar to Fig. 1 but showing part of the coatings having been removed by abrading to produce the finished color scheme on the line.

Fig. 2A is a view similar to Fig. 2 but showing another basic line structure, different from that shown in Fig. 2.

Fig. 3 is a side elevation of a section of finished line having a color scheme produced in accordance with the present invention.

Fig. 4 is a top plan view of an abrading machine for producing the finished color scheme on the line.

Fig. 5 is a sectional view of the abrading machine taken on the line 5—5 of Fig. 4.

Fig. 6 is a sectional view of said abrading machine taken on the line 6—6 of Fig. 4.

Referring particularly to Fig. 3, a section of a line 10 finished in a plurality of irregularly intermingled contrasting splotches of colors is shown in side elevation. The process or method by which the color effect is produced is described hereinafter, but it will be seen that the irregular intermingling of colors comprises a variegated or mottled effect including preferably two or three distinguishable, contrasting and perhaps complementary colors, or shades of the same color. The pattern is actually composed of intermingled splotches of said colors and the particular colors of any particular line will be selected in accordance with the natural object the line is supposed to imitate when used as a fishing line. When used for decorative purposes, the color scheme selected will obviously be one to harmonize with the locale in which the line is to be used.

Objects which are suitable subjects for imitation in producing fishing lines are wood, and particularly waterlogged or rotten wood; shadows on stems of water plants; leaves or blades of water plants closely adhering to the stem of the plant; or, in some instances, perhaps even twigs. Carried to its highest degree of refinement, there are almost unlimited natural objects of an aquatic nature which could be imitated sufficiently closely by the process to be described that fish would be unwary of lines made in accordance with the present invention.

The process for forming decorative or so-called camouflaged lines in accordance with this invention depends largely, in one embodiment, upon the fact that the core or body 12 of the line 10 is woven and thus has an irregular surface contour due to threads of the line passing over each other in the weaving thereof, as well as irregularities in the diameter of the threads. Even if fillers are introduced into the core or central portion of the line, such irregular contour comprising hills and valleys or low portions is present.

The color of the body of the line will usually provide one of the colors. The line may be either woven from threads of the desired base color the finished line is to have, or the woven line may be dyed the desired color, preferably using a waterproof dye.

In Figs. 1 and 2, the upper half of each fragmentary length of the line there shown is illustrated in section. To the body 12 of the line, preferably one or two coatings 14 and 16 of waterproof material are added in a conventional manner and permitted to thoroughly dry. Each coat of material is dried before the next is applied. The coatings may be suitable waterproof oils, lacquers, paints, or otherwise.

After drying, the coated line is then subjected to abrading action on any suitable device, of which the one shown in Figs. 4 through 6 is one example; or such abrading action may be accomplished by hand, using sandpaper or the like, if desired. The object of the abrading action is to remove from the high portions of the body of the line, portions of a single coating 14 if only one is used, or portions of the two coatings 14 and 16 if two are used. Such high portions will obviously be those portions farthest from the center of the line.

In actual practice, it has been found that a woven fishing line has a contour such that the high portions of the body are not all exactly the same distance from the center of the line; whereby removal of portions of a single coating such as 14, or two or more coatings such as 14 and 16, will produce a mottled effect comprising two or more irregularly intermingled colors or shades of the same color. This effect is also partially produced by vibrations imparted to the line in passing over, or in being passed over by, the abrading device. Said vibrations are produced as a result of the line being taut while being abraded and said line will usually repeatedly bounce away from the abrading device while being abraded. A reasonable length or given section of line will thus not exactly resemble any other given section or length since the exact pattern of the line is unpredictable. However, it has further been found that the patterns of colors which are produced by the method involved are highly satisfactory for the intended purposes.

From Fig. 2, it may be interpreted that an even amount of each of the coatings is removed from each of the high spots of the body of the line, leaving similarly shaped splotches or spots of the coatings in the low portions of the body of the line. This is not what actually occurs, however, due to reasons described above and also to one or more of a number of additional factors such as slight kinking or waving of the line after coating; unevenness in the thickness of each of the coatings; unevenness in the thickness of the threads in the line; and greater absorption of the coating by one part of the body of the line than by other parts.

The finished result, therefore, when using two coatings 14 and 16 on the body 12 is similar to that shown in Fig. 3. This result, in principle at least, is as shown in cross section in Fig. 2; wherein the curved dotted lines outline the portion of the coatings 14 and 16 which have been removed by abrading action. It will thus be seen that the finished line has a substantially smooth and even outer contour due to low portions of the irregular contour of the body 12 of the line being filled with portions of one or more coatings, the outer surface of said coating portions being substantially level with the high portions of the body 12.

While it has been stated hereinabove that one or two coatings 14 and 16 may be employed, it is obvious that a plurality of coatings in excess of two may be used if a desired pattern requires the same. It is also to be understood that the body of the line is preferably colored or may be black or white; the latter two being considered colors for purposes of this description and in the appended claims.

While one embodiment of the line shown specifically in Figs. 1 and 2 has comprised a woven body, the results of the invention may be attained by using a body 12a such as shown in somewhat exaggerated form in Fig. 2A. Said body or core may be formed from any suitable pliable material of which "nylon" is only one of a number of examples. One or more coatings 14 and 16 of colors distinguishable from each other and that of the body 12a are successively applied to the body of the line. These coatings are relatively thin as compared to the diameter of the body 12a and are preferably thinner than the coatings 14 and 16 of the embodiment shown in Figs. 1 and 2 as can be seen by comparing Fig. 2A with said figures.

Due principally to the vibrating or chattering of the line in passing over the abrading device, irregular areas of the coatings 14 and 16 will be removed, exposing irregular areas of the body 12a between the remaining irregular areas or splotches of colored coatings. In some instances, shallow portions of the body 12a may be removed, as indicated at 13 by dotted line outline, but this will present no ill effect to the finished product. In other instances, only part of coating 16 will be removed in certain areas, thus effectively producing a suitably mottled final appearance.

Further, if desired, a woven line may have the depressions thereof suitably filled so as to produce a substantially smooth surface prior to applying coatings 14 and/or 16. The finished mottled appearance is then produced by means and in a manner as described immediately hereinabove.

The sectional views in Figs. 1, 2, and 2A are exaggerated to better illustrate the principles of the invention and it is to be understood that the contour of the finished lines illustrated in section in Figs. 2 and 2A especially will not have the various high and low spots of said surface so obviously visible.

Referring to Figs. 4 through 6, an abrading machine is illustrated which is suitable for automatically producing the desired abrading action on a coated line. A line having either a woven or smooth body and the desired number of coatings applied thereto is wound on a suitable reel 18. Said line is then passed around a plurality of sets of axially aligned pulleys 20 and 22, each set being preferably commonly mounted on one of a pair of shafts 24 and 26 for independent and free rotation relative to said shafts. The line is coiled onto reel 28 which is driven by a suitable motor and an automatically driven roving guide 30 driven by the same motor assures even winding of the line in successive layers upon reel 28.

In passing in one direction between each of the pulleys 20 and 22, the line passes over the operating surface 32 of an abrading disc or wheel 34 which is driven by a rotatable shaft 36. The surface 32 may be either broadly conical or oval, as desired. As shown in sectional Figs. 5 and 6, ample contact of the line with the abrading wheel is afforded since the device illustrated affords five passes of the line in contact with the wheel. A greater or less number of passes may be used, as requirements demand, or the entire coil of line may run between the reels more than one time if necessary. A plurality of passes, as provided, in combination with the area of the abrading wheel and the rotation thereof, will insure that the coating or coatings will be removed from substantially all of the high portions of the body of a woven line, and the vibrating or chattering of the line in passing over the abrading wheel, for example, will render contact between the line and the wheel such that irregular areas of the coatings will be removed from each other and/or the body of the line, regardless of whether said body is smooth-surfaced or woven. During such passing of the line over the abrading wheel and around pulleys 20 and 22, the line also will be rotated about its axis, thus insuring that removal of the aforementioned areas of coatings around the entire circumference of the line will be effected.

It is recognized, however, that in effecting certain variegated designs, it will not be desirable to remove the coatings from the high portions until the body of the line is exposed. Under such circumstances, the innermost of a plurality of coatings will serve as the so-called base color of the irregularly intermingled splotches of color of the finished line.

While the invention has been illustrated and described in its several preferred embodiments and has included certain details, it should be understood that the invention is not to be limited to the precise details herein illustrated and described since the same may be carried out in other ways, falling within the scope of the invention as claimed.

What I claim is:

1. A fishing line having a core provided with an exterior surface of a predetermined color throughout its extent, a coating of a different color surrounding the exterior surface of the core, and a second coating of a different color than the first coating surrounding the core, portions of the second coating covering portions of the first coating and portions of both coatings being spaced from other portions thereof to provide openings rendering accessible to view spaced portions of the exterior surface of the body of the core.

2. A fishing line of the character set forth in claim 1 and in which said core is woven from threads and presents an irregular outer surface to which said coatings are applied.

3. A fishing line of the character set forth in claim 1 and in which the outer surface of said core is substantially cylindrical and smooth.

4. The process of manufacturing a fishing line to produce a surface effect of a variety of colors and the color of the core of the line exposed at the surface comprising providing a fishing line of one color as a core, applying thereto in successive steps pigmented coatings of different colors, each coating being thoroughly dried prior to the application of a successive coating, and after the final coating has been dried, removing spaced portions of the coatings by abrasive action, said abrasive action also removing spaced portions of the core, and revolving said line about its axis while subjecting said line to said abrasive action.

5. The process of claim 4 further characterized by applying said coatings to a core comprising a woven line and principally removing portions of said coatings from those areas covering the portions of the woven line core which are the greatest distances from the axis thereof.

6. The process of claim 4 further characterized by applying said coatings to a core having a substantially smooth cylindrical surface and removing said portions of said coatings by vibrating said line while abrading said coatings and thereby effecting the removal of spaced portions of said coatings and core from said core.

MARVIN K. HEDGE.

REFERENCES CITED

The following references are of record in the file of this patent:

UNITED STATES PATENTS

| Number | Name | Date |
|---|---|---|
| Re. 17,654 | Weber | Apr. 29, 1930 |
| 272,558 | Cowles | Feb. 20, 1883 |
| 1,306,310 | Morris | June 10, 1919 |
| 1,775,668 | Buhler | Sept. 16, 1930 |
| 1,846,912 | Sedgley | Feb. 23, 1932 |
| 1,985,236 | Blatz | Dec. 25, 1934 |
| 2,024,257 | Snelling | Dec. 17, 1935 |
| 2,058,620 | Petitmermet | Oct. 27, 1936 |
| 2,215,760 | Ledrich | Sept. 24, 1940 |
| 2,274,255 | Pierce | Feb. 24, 1942 |

FOREIGN PATENTS

| Number | Country | Date |
|---|---|---|
| 6,316 | Great Britain | of 1911 |
| 25,611 | Great Britain | of 1903 |
| 32,929 | Norway | Dec. 27, 1922 |
| 220,814 | Great Britain | Aug. 28, 1924 |